Sept. 1, 1970          E. C. WORTZ          3,526,135

TEMPERATURE DETECTING SYSTEM

Filed Dec. 29, 1967

INVENTOR.
EDWARD C. WORTZ

BY Fraser and Bogucki

ATTORNEYS

United States Patent Office 3,526,135
Patented Sept. 1, 1970

3,526,135
TEMPERATURE DETECTING SYSTEM
Edward C. Wortz, Northridge, Calif., assignor to The Garrett Corporation, Los Angeles, Calif., a corporation of California
Filed Dec. 29, 1967, Ser. No. 694,632
Int. Cl. G01j 5/00
U.S. Cl. 73—355                         14 Claims

ABSTRACT OF THE DISCLOSURE

A radiation thermometer for detecting changes in temperature of localized body regions as an indication of vasomotor activity in response to stimuli. An ultraviolet tracking device may be provided to keep the thermometer sensor aligned with the regions of interest.

CROSS-REFERENCE TO RELATED APPLICATION

Ser. No. 665,396, filed Sept. 5, 1967, same inventor and assignee as the instant application.

BACKGROUND OF THE INVENTION

Field of the invention

The automatic nervous system (ANS) consists of the nerves, ganglia and plexuses that provide innervation to many structures whose functions are not voluntarily controlled. Such structures include the heart, blood vessels, smooth muscle, and glands. This lack of voluntary control is implied by the name "autonomic" as well as by the other names for the system: involuntary, visceral or vegetative nervous system. The control of the autonomic nervous system, however, takes place not only from reflex arcs but also from centers located within the central nervous system, specifically the brain, that are greatly influenced by conscious processes, so that the autonomic nervous system is to a large extent affected by activity in higher regions of the central nervous system. Because of these autonomic responses to higher activity and because they are not generally subject to conscious control, the measurement of such responses forms a valuable adjunct to psychology and psychiatry.

The various effector organs of the body respond in differing manner to ANS control. Because psychological or emotional changes can produce changes in ANS outflow, such changes are commonly measured in psychophysiological research. The changes measured may be very transient, such as respiration, cardiovascular, or neurophysiological changes; or more durable, such as alimentation and endocrine function changes; or chronic somatic changes, such as the production of stress syndrome symptoms like gastric ulcers, etc. The transient changes are most commonly measured for several reasons, including technical ease and the ability to evoke such changes without serious damage to human subjects. An important factor in selecting the response to be measured is the convenience of measuring the effect; thus the initiation of glycogenolysis in the liver is significantly more difficult to measure than, for example, heart rate. Another factor is the intensity and/or the duration of the stimulus required to produce the effect. This necessarily requires an empirical approach, as considerable individual differences exist in the degree of response to various stimuli between one subject and another. It is apparent, but should be noted, that unlimited and unidirectional change in any parameter is impossible; it is more significant for a human subject to note the change of a measured parameter as a response rather than the absolute condition as a response.

It should be noted that there is a correlation between cardiovascular effect and vasomotor response. Thus, detection of vasomotor response can be an important clinical tool in the early detection of cardiovascular "types," that is, subjects who may be prone to cardiovascular deterioration over long periods of extreme response to emotional disturbances. Early detection may make possible conditioning and retraining in order to eliminate or alleviate such effects.

It should also be noted that changes in the skin occurring in response to ANS outflow correlate with vasomotor response. Probably the single most useful measure of psychophysiological state, at least of those measures that have been routinely employed, is one of the several measures of the electrical properties of the skin. All of these measurements rely on the fact that small, fluctuating electrical potentials exist between separate areas of the skin, and that a changing electrical resistance exists between two such separate areas. The measurements made are of skin resistance (SR), skin conductance (SC), or galvanic skin response (GSR). Basically, each of these measures indicates the changing electrical state of the skin, and the similarity of the tracings presenting the detected responses justifies the lumping of all three measures as "GSR." The correlation between GSR and heart rate is one basis for the importance of this measure as an indication of psychophysiological state and its usefulness in the detection of particular types of emotionally over-affected individuals. However, GSR is essentially a unilateral response and is therefore incapable of providing any indication of the difference between types of stimuli in their effect on the subject. Vasomotor activity, on the other hand—at least in certain portions of the body—develops a different response depending upon the type and signal significance of stimulus.

Description of the prior art

The great power and sensitivity of autonomic measures cannot be over-emphasized. Responses to emotionally-laden signals are detectable by psychophysiological measures even when the signals are so faint that they are not consciously detected, and even when the conscious identification of the signal is incorrect. Still it must be emphasized that the detection that is afforded merely indicates that some stimulating event has occurred, and not the quality of the event or the quality of the subject's response to it. Variations in response do exist; heart rate often rises, but it may fall, and so may blood pressure, etc. Attempts at measuring body temperature effects as responses to stimuli include detection of the temperature of the blood in the carotid artery which stimulates the hypothalamus to perform its thermoregulatory function in the control of body temperature and the use of highly specialized equipment to sense suffused effects corresponding to responses to stimuli, such as blushing and the like. However, such responses may be rather gross in effect and not sufficiently precise as a measurement of the response to provide the information which is desired.

Specific blood vessels in the head, unlike those in the portion of the body below the neck, exhibit differential vasomotor activity as a function of the particular stimuli. This differentiation of response is highly desirable as a mechanism for distinguishing between the orientation reaction, also known as the investigating or "what-is-it?" reaction, and the defensive or startle reaction. Of the specific blood vessels in the head which demonstrate differentiated vasomotor response, the temporal artery is important for its accessibility to measurement and the response which it displays. Depending on the response, the temporal artery may constrict or dilate. A change of temperature in the skin and tissue in the immediately surrounding region occurs as a result of the change of diameter of the artery as it dilates or constricts. These changes in temperature are sequential in the given direction, either cooling or warming, with repeated presentation of the particular stimulus, thus indicating stepwise contractions or dilations (as the case may be) of the artery. Thus there is a corresponding noticeable response to a stimulus occurring before the response condition of the previous stimulus has dissipated. Apart from my own activities in this field, I know of no developments in the prior art directed to the specific subject matter of the present invention.

SUMMARY OF THE INVENTION

It is known that the temporal artery, along with other arteries in the head, experiences vasomotor activity in accordance with responses of the individual to stimuli. The types of responses may be classified on the basis of the type, character or psychological nature of the stimuli that evoked a defined syndrome of physiological changes. The responses of interest comprise the orientation reaction, which is basically a mechanism for paying attention to a novel stimulus, and the startle-defensive reaction which may be elicited by anything that startles a person, for example, firing a revolver behind him. Several variables control whether a stimulus elicits a startle-defensive reaction or an orientation response. These include the intensity of the stimulus, the number of repetitions, and the signal value of the stimulus. Most of the readily measurable physiological responses are the same for both orientation and startle-defensive responses.

The major distinct and measurable physiological difference between the two is in the area of vasomotor tone. In the orientation reaction there is vasoconstriction in the surface blood vessels of the limbs and vasodilation in the head; in the startle-defensive reaction there is vasoconstriction in the surface of the head as well as in the limbs. Thus, a measure of the diameter of the temporal artery, the most readily accessible of those in the head, may provide information both as to the occurrence of a response and as to the type of response experienced.

It would be possible to measure the expansion or retraction of the skin immediately over the temporal artery as an indication of the change of artery diameter, but this would in most instances necessitate actual contact with the subject and result in a condition which is uncomfortable and perhaps painful and which might have a continuing effect on the actual responses of the subject. I prefer to detect minute changes in temperature in the region of the temporal artery which correspond to the changes in diameter of the artery as the response. Therefore, I have devised systems in accordance with the invention for observing the region of the temporal artery of a subject and detecting differences in temperature as indications of various responses of the subject to particular stimuli. One particular advantage of such systems in accordance with the invention is that there is no need for actual physical contact between the system's sensor and the subject, thus eliminating entirely the undesired interaction between the response detection system and the subject's response.

One particular arrangement in accordance with the invention comprises a sensor including a radiometer in the form of a thermistor, bolometer or thermocouple positioned at the focus of a paraboloid surface for enhanced sensitivity. The unit is sensitive to infrared radiation in the five- to nine-micron range, and preferably develops a peak sensitivity in the vicinity of seven microns of received wave-length. The senor is desirably maintained directed at the temporal artery of the subject by means of a tracking stage which is responsive to the signals which are received by the sensor. The output of the sensor is applied to a processing stage for amplification and conversion and thence to a display which may be in any form as desired by the user. Of course, the tracking stage may be dispensed with if the subject's head is held still, as may be the case where the subject is reclining on a psychiatrist's couch or is in some other situation where the head is fixed in position.

In another particular arrangement in accordance with the invention, the sensor and the other stages of the system are fixed, rather than mobile, for tracking of the subject. Tracking is accomplished by means of a mirror (or mirrors) interposed between the subject and the sensor, with the mirror being controlled as to appropriate angle in response to the tracking stage which develops tracking signals directly from the subject. In this arrangement, the tracking is accomplished by means of ultraviolet light directed to and reflected from the subject, preferably by means of reflective tape or paint placed on a localized area in the vicinity of the region desired for observation. This permits more noise-free operation and also simplifies the tracking function, since there is substantially less mass in the mirror which is used for reflecting infrared signals from the subject to the sensor than is present in the movable sensor of the first-mentioned arrangement in accordance with the invention.

In the second arrangement in accordance with the invention, a particular feature of the invention is used to advantage to develop a more sensitive detection of temperature changes. As a measure of temperature change, the temperature detected by systems in accordance with the invention by infrared radiation from the subject is compared with some reference temperature. Unless some manner of compensation is provided, such a system may be subject to errors resulting from variations in ambient temperature and drift of body temperature with time as a result of various physiological phenomena such as fever, adjustment to ambient conditions, activity of the individual, and the like. All of these sources of possible error are avoided in one particular arrangement in accordance with the invention wherein the subject itself is used as the source of reference temperature. This particular embodiment utilizes two temperature pickups, one being the sensitive and sharply focused radiometer already described, and the other being a defocused pickup which develops a signal in accordance with an average temperature over a larger region of the subject's head including the temporal artery point which is observed by the paraboloid radiometer. Thus, as the subject undergoes some change of temperature with time, which is not due to the short-term temperature changes corresponding to responses evidenced by vasomotor activity in the temporal artery, the reference temperature point with which such vasomotor changes are compared drifts accordingly and the common effect in both instances is cancelled out.

The particular equipment which is employed in arrangements in accordance with the invention (i.e. the amplifiers transducers and related equipment employed in the sensing, processing and tracking stages) are state-of-the-art devices and, in and of themselves, do not constitute the invention.

BRIEF DESCRIPTION OF THE DRAWING

A better understanding of the present invention may be had from a consideration of the following detailed description, taken in conjunction with the accompanying drawing, in which.

DESCRIPTION OF THE PREFERRED EMBODIMENTS

Figure 1:
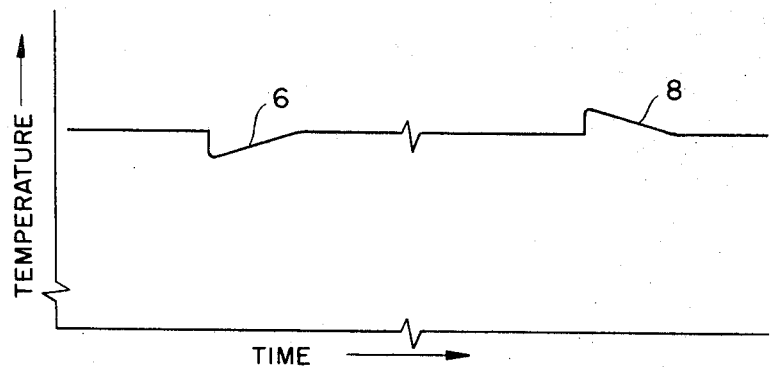
FIG. 1 is a diagram showing the types of responses which are detected by arrangements in accordance with the invention.

FIG. 1 of the drawing represents a graph of detected temperature as a function of time, or with the occurrence of different events. Changes in temperature of the region of interest in the vicinity of the temporal artery correspond to the changes in the diameter of the artery. Thus, the temperature variation waveform 6 representing a fairly rapid decrease in temperature followed by a return of the detected temperature to a stable baseline over a longer period of time corresponds to a constriction of the temporal artery in response to some event experienced by the subject followed by a return to the stable or baseline temperature over a more extended period of time. Similarly, the waveform 8 illustrating a fairly rapid increase of temperature followed by a more extended decrease to the baseline corresponds to a dilation and recovery of the temporal artery as a response to some event or stimulus. The waveforms which are represented in FIG. 1 are fairly representative of the actual change which is encountered, the initial change being relatively rapid and occurring within perhaps 0.1–0.5 second following the event to which it is a response, and the recovery tailing out over perhaps as many as seven or eight seconds before recovery to the stable temperature condition occurs.

Figure 2:
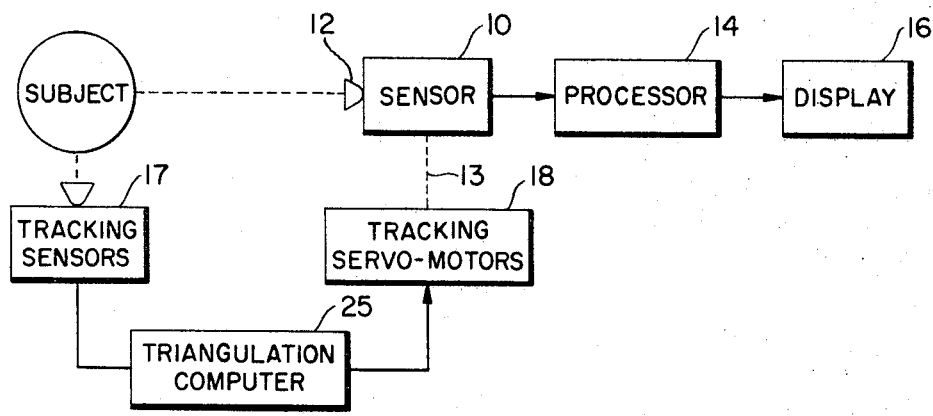
FIG. 2 is a block diagram indicating one particular arrangement in accordance with the invention.

FIG. 2 represents one particular arrangement in accordance with the invention for detecting temperature changes of the type illustrated in FIG. 1 without the necessity for direct physical contact with the subject, and is shown comprising a sensor 10 having a parabolic pickup 12 directed toward the region of interest on the subject (the temporal artery) with the output of the sensor 10 being directed toward a signal processor 14 for ultimate presentation in a display stage 16. The parabolic pickup 12 of the sensor 10 is maintained directed toward the region of interest by a tracking stage 18 which is controlled by a triangulation computer 25 in response to signals from a tracking sensor 17 which is located to sense changes in position of the subject, particularly in the target region of interest. The tracking stage 18 thus controls the position of the sensor 10 to keep the pickup 12 directed at the subject target area by means of a mechanical connection represented by the broken line 13. In order that a more precise measurement of the detected temperature may be achieved, the signals corresponding to the radiation received by the parabolic pickup 12 may be compared with a reference heat source within the sensor 10.

Figure 3:
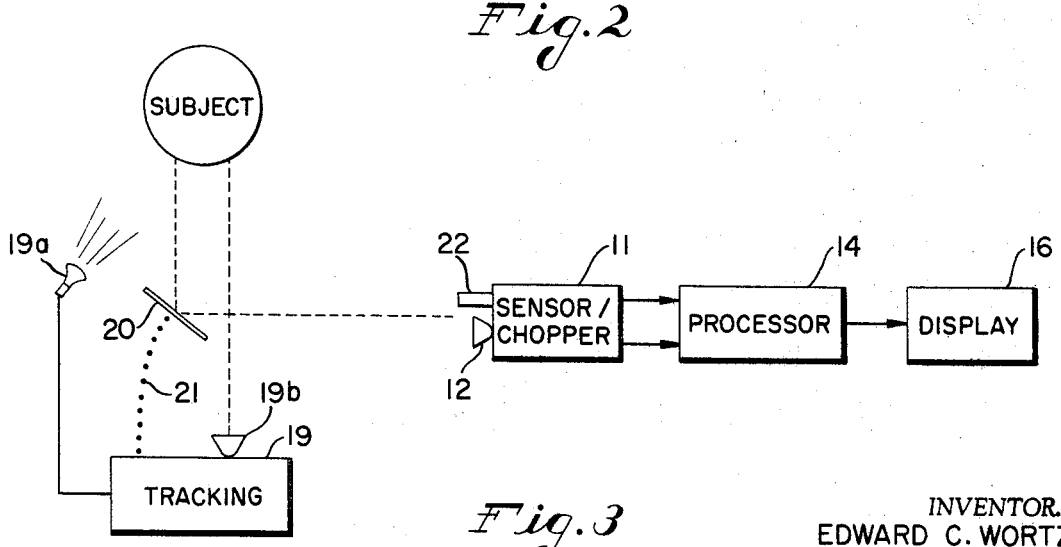
FIG. 3 is a block diagram representing another particular arrangement in accordance with the invention.

The arrangement in accordance with the invention which is shown in FIG. 3 is different from that in FIG. 2 in that a separate tracking arrangement is employed utilizing a movable mirror 20 controlled by a tracking stage 19, the mechanical coupling to the mirror 20 being represented by the dotted line 21. In this particular arrangement, the subject is provided with a piece of reflective tape or some reflective paint positioned in the region of interest, and an ultraviolet light source 19a in the tracking stage 19 directs light toward the subject which is reflected by the tape or paint and picked up by a pickup 19b to develop the control for the positioning of the mirror 20 by the tracking stage 19. Infrared radiation from the temporal artery region is reflected from the mirror 20 toward a sensor/chopper stage 11. In this particular arrangement in accordance with the invention, the sensor/chopper stage 11 is adapted to develop its own reference temperature source from observation of the subject over an extended area including the particular target area of the temporal artery. With this purpose, the sensor/chopper stage 11 includes a defocused pickup 22 in addition to the focused pickup 12 of the parabolic pickup type described in connection with FIG. 2. The radiation detected by the defocused pickup 22 provides an average temperature of the subject, at least for some area greater than, but also including, the particular target point to which the focused pickup 12 is directed. Thus the signals from the two pickups 12 and 22 are compared within the sensor/chopper 11 so that gross changes in temperature resulting from temperature drift of the subject are cancelled out. The resulting signals are applied to the processor 14 and thence to the display stage 16 in the manner shown in FIG. 2.

Particular arrangements in accordance with the invention as depicted in FIGS. 2 and 3 included a radiometer pickup having a parabolic reflector of the type set forth in my above-referenced copending application coupled via a Model AM–1 transformer manufactured by Princeton Applied Research (PAR) to a Model CR–4 preamplifier manufactured by PAR, followed by a PAR Model JB–4 amplifier driving a Beckman Dynagraph Recorder. The signal chopping rate is controlled by an American Time Products oscillator/chopper. In the arrangement of FIG. 2, the sensor 10 includes as a temperature reference source a Loenco Inc. Model 60 Proportional Temperature Controller. Tracking is accomplished in a manner known to those skilled in the art of infrared target acquisition and tracking by means of servomotor systems. Particularly cool points on the head such as the tip of the nose and the lobe of the ear may be used as fixed reference points, i.e. physically invariant with respect to the location of the temporal artery of a specific person.

In the operation of arrangements in accordance with the invention, the system is set up by aligning the pickup mechanism, the position of which is controlled by the tracking stage 18 or 19, with the temporal artery target area of the subject's head. This is rather easily detected at the outset because, when properly aligned, the system picks up the arterial pulse. This advantageously assists in the initial location and alignment with the target area and in addition provides pulse rate information as an extra useful measurement of psychophysiological response. Once the infrared pickup 12 is aligned with the target area, the tracking stage 18 or 19 is then switched on and thereafter alignment is maintained automatically. Thereafter, the plot of temperature at the target point along the temporal artery is displayed, preferably by way of a recording in the manner depicted in FIG. 1. Arrangements in accordance with the present invention advantageously provide information both as to the occurrence of a particular response and as to the type of response involved by virtue of the indication of direction of the temperature change. The fact that the direction of change is indicative of the character of the response is an additional area of usefulness. A vaso-constrictive response such as corresponds to the temperature change waveform 6 of FIG. 1 is particularly useful, since vasoconstriction is related to coronary and brain damage. Thus, the use of apparatus in accordance with the invention may be an important tool in psychotherapy by identifying the defensive reaction and in medicine by providing early detection of potential cardiovascular disease by the discovery of a personality syndrome which is prone to responses of the type which are likely to result in such disease. In this way, the invention provides a much more precise determination of the type of response encountered than has heretofore been available to the psychotherapist or physician, who until now has relied principally on his personal knowledge of the individual subject and on other less specific and less precise measuring means.

Although there have been described above particular methods and arrangements of infrared detection systems in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

What is claimed is:

1. Apparatus for detecting vasomotor activity in biological subjects which may be movable comprising:
   radiation responsive means for sensing the temperature of a localized body region subject to vasomotor activity in response to external stimuli;
   means for developing electrical signals representative of the sensed temperature;

means coupled to the sensing means for processing said electrical signals;

means connected to the processing means for providing a record of said signal; and means for directing the sensing means toward said localized body region in response to radiation from a selected target region of the body as the subject moves.

2. Apparatus for detecting vasomotor activity in biological subjects which may be movable comprising:

thermal radiation responsive means for sensing changes in temperature of a localized body region in response to vasomotor activity in said region;

means for developing electrical signals representative of said changes;

means coupled to the sensing means for processing said electrical signals;

means for directing the sensing means toward said localized body region in response to radiation from a selected target region of the body as the subject moves.

3. Apparatus in accordance with claim 2 wherein said record providing means comprises means for providing a graphical display.

4. Apparatus in accordance with claim 2 wherein said sensing means includes a transducer responsive to infrared radiation of wave lengths in the five- to nine-micron range.

5. Apparatus in accordance with claim 4 wherein said transducer develops a peak sensitivity to infrared radiation of a wave length of approximately 7 microns.

6. Apparatus in accordance with claim 2 wherein the directing means includes a second sensor responsive to different radiation from that corresponding to the temperature of said localized body region.

7. Apparatus in accordance with claim 6 wherein the directing means includes means for detecting movement of the target region of the subject and for maintaining the path of the thermal radiation from the subject to the sensing means.

8. Apparatus in accordance with claim 7 further including a mirror the attitude of which is responsive to the directing means for maintaining said path of radiation between the subject and the sensing means.

9. Apparatus in accordance with claim 6 wherein said directing means comprises an ultraviolet light source and an ultraviolet light detector responsive to ultraviolet light from said source reflected from the subject.

10. Apparatus for detecting vasomotor activity in biological subjects which may be subject to movement comprising:

thermal radiation responsive means for sensing changes in temperature of a localized body region in response to vasomotor activity in said region;

means for developing electrical signals representative of said changes;

means coupled to the sensing means for processing said electrical signals;

means connected to the processing means for providing a record of said signals; and means for directing the sensing means toward the temporal artery of the subject as the subject moves.

11. Apparatus for detecting vasomotor activity in biological subjects comprising:

thermal radiation responsive means for sensing changes in temperature of a localized body region in response to vasomotor activity in said region;

means for developing electrical signal representative of said changes;

means coupled to the sensing means for processing said electrical signals;

means connected to the processing means for providing a record of said signals; and means for comparing radiation from said localized body region with other thermal radiation from the body of the subject in order to eliminate the effects of common variations in said thermal radiation.

12. Apparatus in accordance with claim 11 wherein the means for sensing temperature changes comprises a first infrared sensitive pickup device focused to be responsive to the temperature of a small localized area in a target region, a defocused radiation pickup device directed to be responsive to the temperature of a larger localized area of the target region, the larger localized area including the small localized area, and means for comparing the temperatures sensed by both of said pickup devices in order to cancel out temperature changes which occur equally in both of said areas.

13. The method of detecting and measuring vasomotor activity in a biological subject comprising the steps of:

selecting a target region of said organism including the temporal artery which undergoes vasomotor change;

remotely detecting thermal radiation from the target region;

maintaining the detection of radiation from the subject target region despite movement of the target region by the subject; and providing a display corresponding to the radiation so detected.

14. The method of claim 13 wherein the step of maintaining radiation detection from the target region includes utilizing ultraviolet light reflected from the subject to determine movement of the target region and to compensate for such movement.

References Cited

UNITED STATES PATENTS

| | | | |
|---|---|---|---|
| 3,415,994 | 10/1968 | Fitti. | |
| 3,446,968 | 5/1969 | Torok | 250—203 XR |
| 2,195,019 | 3/1940 | Bloomheart. | |
| 2,856,540 | 10/1958 | Warshaw | 73—355 XR |
| 2,978,589 | 4/1961 | Howell. | |
| 3,282,106 | 11/1966 | Barnes | 73—355 |
| 3,305,686 | 2/1967 | Carter et al. | 250—203 |

LOUIS R. PRINCE, Primary Examiner

F. SHOON, Assistant Examiner

U.S. Cl. X.R.

250—83.3